US007040414B1

(12) United States Patent
Kuo

(10) Patent No.: US 7,040,414 B1
(45) Date of Patent: May 9, 2006

(54) PNEUMATIC TOOL

(76) Inventor: David Kuo, No. 4, Shin Ho Road, Tainan (TW)

( * ) Notice: Subject to any disclaimer, the term of this patent is extended or adjusted under 35 U.S.C. 154(b) by 0 days.

(21) Appl. No.: 10/991,238

(22) Filed: Nov. 16, 2004

(51) Int. Cl.
*B23Q 5/00* (2006.01)

(52) U.S. Cl. ...................... 173/179; 173/176; 173/177; 173/218; 173/169

(58) Field of Classification Search ................ 173/179, 173/176, 177, 18, 218, 221, 168, 169, 170; 418/32, 159, 270
See application file for complete search history.

(56) References Cited

U.S. PATENT DOCUMENTS

| | | | | |
|---|---|---|---|---|
| 2,414,638 | A * | 1/1947 | Dobie | 418/1 |
| 4,016,941 | A * | 4/1977 | Sanders | 173/170 |
| 5,740,892 | A * | 4/1998 | Huang | 192/43.1 |
| 5,918,686 | A * | 7/1999 | Izumisawa | 173/20 |
| 6,082,986 | A * | 7/2000 | Seward et al. | 418/270 |
| 6,250,399 | B1 | 6/2001 | Giardino | |
| 6,880,645 | B1 * | 4/2005 | Izumisawa | 173/93.5 |
| 6,883,619 | B1 * | 4/2005 | Huang | 173/93.5 |
| 6,902,011 | B1 * | 6/2005 | Hall | 173/169 |

* cited by examiner

*Primary Examiner*—Scott A. Smith
*Assistant Examiner*—Brian Nash
(74) *Attorney, Agent, or Firm*—Knobbe Martens Olson & Bear LLP

(57) ABSTRACT

A pneumatic tool includes a housing, a driving mechanism, a rear cap, a direction controller, a speed controller, and an operating member. The housing is formed with a component chamber and an intake passageway. The driving mechanism includes an output shaft rotatable about a rotary axis. The rear cap defines a cap chamber in spatial communication with the component chamber, and has a connecting passageway that intercommunicates the cap chamber and the intake passageway. The direction controller and the speed controller are mounted in the cap chamber for rotation about the rotary axis. The operating member is coupled to the direction controller, is accessible externally of the rear cap and the housing, and is operable to drive rotation of the direction controller about the rotary axis, thereby controlling direction of rotation of the output shaft. The speed controller is operable to vary torque and speed of the output shaft.

13 Claims, 10 Drawing Sheets

PNEUMATIC TOOL

BACKGROUND OF THE INVENTION

1. Field of the Invention

The invention relates to a pneumatic tool, more particularly to a pneumatic tool with direction and speed control.

2. Description of the Related Art

A pneumatic tool that permits torque and speed control in both forward and reverse directions is known in the art (see, for example, U.S. Pat. No. 6,250,399). However, since speed and direction adjustment operations in the known pneumatic tool generally require both hands of the user for manipulation, there is still some room for improvement in the design of such pneumatic tools.

SUMMARY OF THE INVENTION

Therefore, the object of the present invention is to provide a pneumatic tool including direction and speed controllers that can facilitate speed and direction adjustment operations.

Accordingly, a pneumatic tool of the present invention comprises a housing, a driving mechanism, a rear cap, a direction controller, a speed controller, and an operating member.

The housing is formed with a component chamber and an intake passageway. The component chamber has a rear end.

The driving mechanism is mounted in the component chamber, and includes a rear bearing member disposed proximate to the rear end of the component chamber and having a rear side, an air cylinder device disposed in front of the rear bearing member and formed with a cylinder chamber, and an output shaft coupled to the air cylinder device for rotation about a rotary axis. The rear bearing member is formed with a first forward hole and a first reverse hole that are in spatial communication with the cylinder chamber.

The rear cap has a peripheral wall coupled to the housing at the rear end of the component chamber. The peripheral wall defines a cap chamber that is in spatial communication with the component chamber. The rear cap is formed with a connecting passageway that intercommunicates the cap chamber and the intake passageway.

The direction controller is mounted in the cap chamber, and is rotatable about the rotary axis. The direction controller includes a base wall transverse to the rotary axis, and first and second abutment posts that project from the base wall and that are disposed to abut against the rear side of the rear bearing member. The direction controller has a second forward hole formed through the base wall and the first abutment post, and a second reverse hole formed through the base wall and the second abutment post.

The speed controller is mounted in the cap chamber, and is rotatable about the rotary axis. The speed controller includes a ring wall formed with a forward speed regulator and a reverse speed regulator, and an operating part that extends from the ring wall in a direction away from the component chamber and that is accessible externally of the rear cap and the housing.

The operating member is coupled to the direction controller, and is accessible externally of the rear cap and the housing. The operating member is operable to drive rotation of the direction controller about the rotary axis for aligning the first and second forward holes such that air for driving forward rotation of the output shaft is able to flow into the cylinder chamber via a first flow path that includes the intake passageway, the connecting passageway, the forward speed regulator, and the first and second forward hole. The operating member is further operable to drive rotation of the direction controller about the rotary axis for aligning the first and second reverse holes such that air for driving reverse rotation of the output shaft is able to flow into the cylinder chamber via a second flow path that includes the intake passageway, the connecting passageway, the reverse speed regulator, and the first and second reverse holes.

The operating part of the speed controller is operable to vary extent of overlap between one of the forward and reverse speed regulators and a corresponding one of the second forward and reverse holes for regulating amount of air flow through one of the first and second flow paths, thereby varying torque and speed of the output shaft accordingly.

BRIEF DESCRIPTION OF THE DRAWINGS

Other features and advantages of the present invention will become apparent in the following detailed description of the preferred embodiments with reference to the accompanying drawings, of which.

DETAILED DESCRIPTION OF THE PREFERRED EMBODIMENTS

Figure 1:
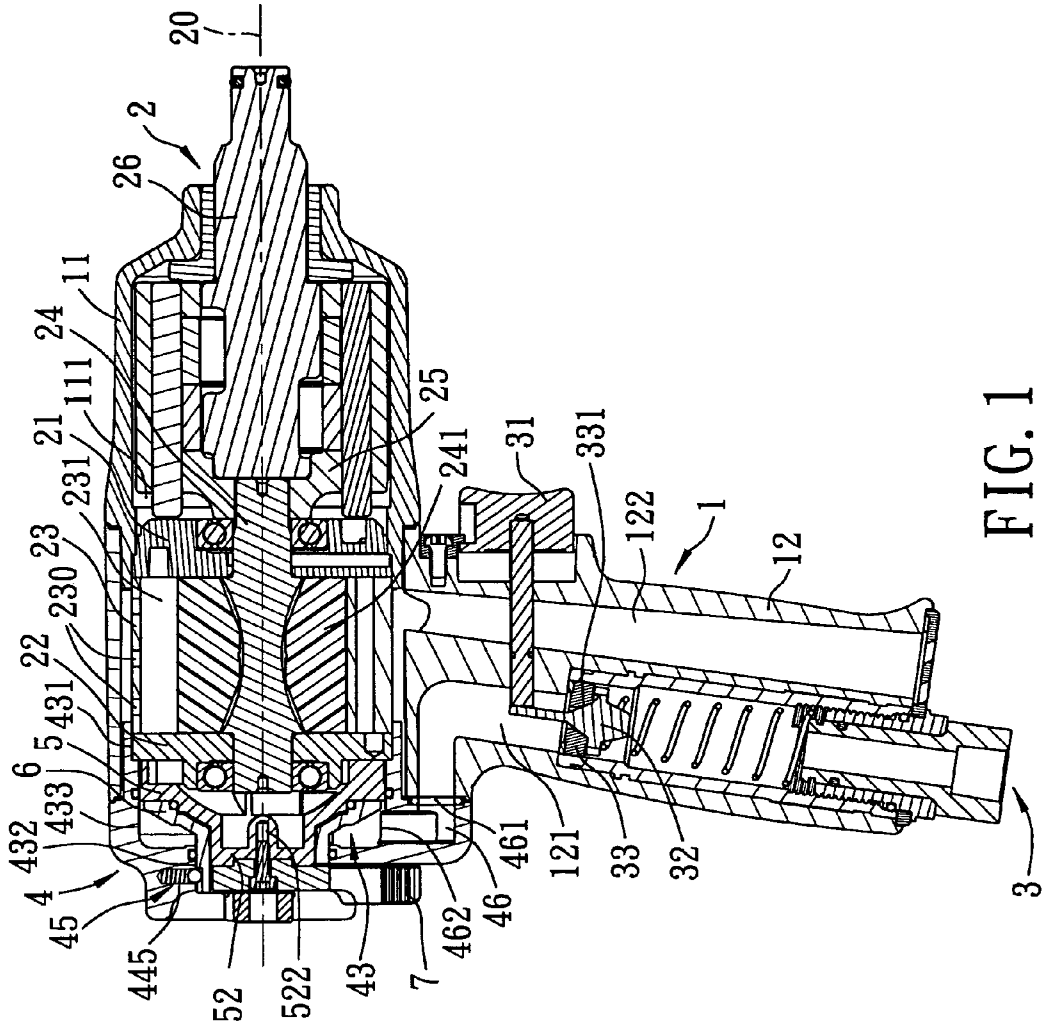
FIG. 1 is an assembled sectional view of the first preferred embodiment of a pneumatic tool according to the present invention.

Before the present invention is described in greater detail with reference to the accompanying preferred embodiments, it should be noted here in that like elements are denoted by the same reference numerals throughout the disclosure.

Figure 2:
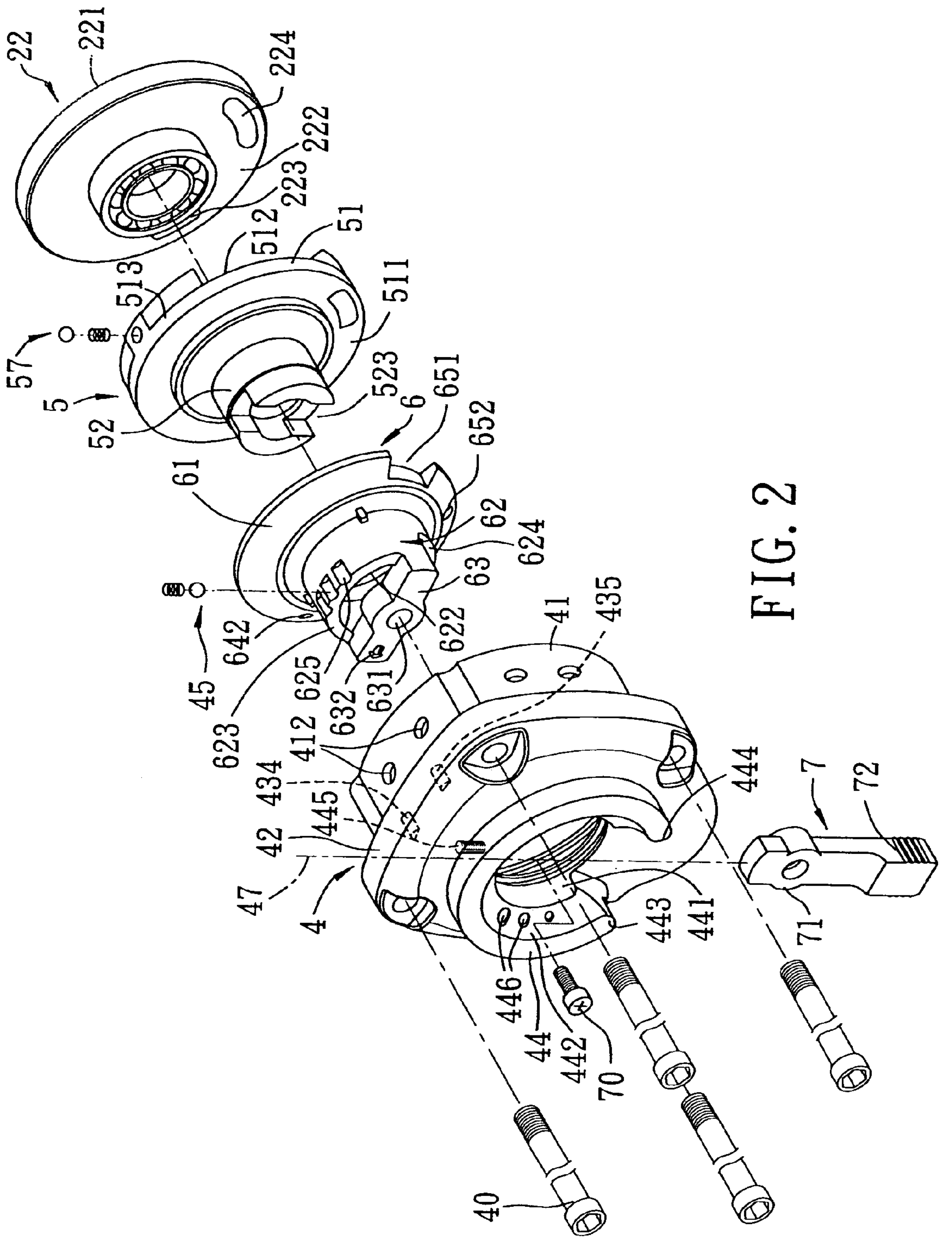
FIG. 2 is a fragmentary rear exploded perspective view of the first preferred embodiment.
Figure 3:
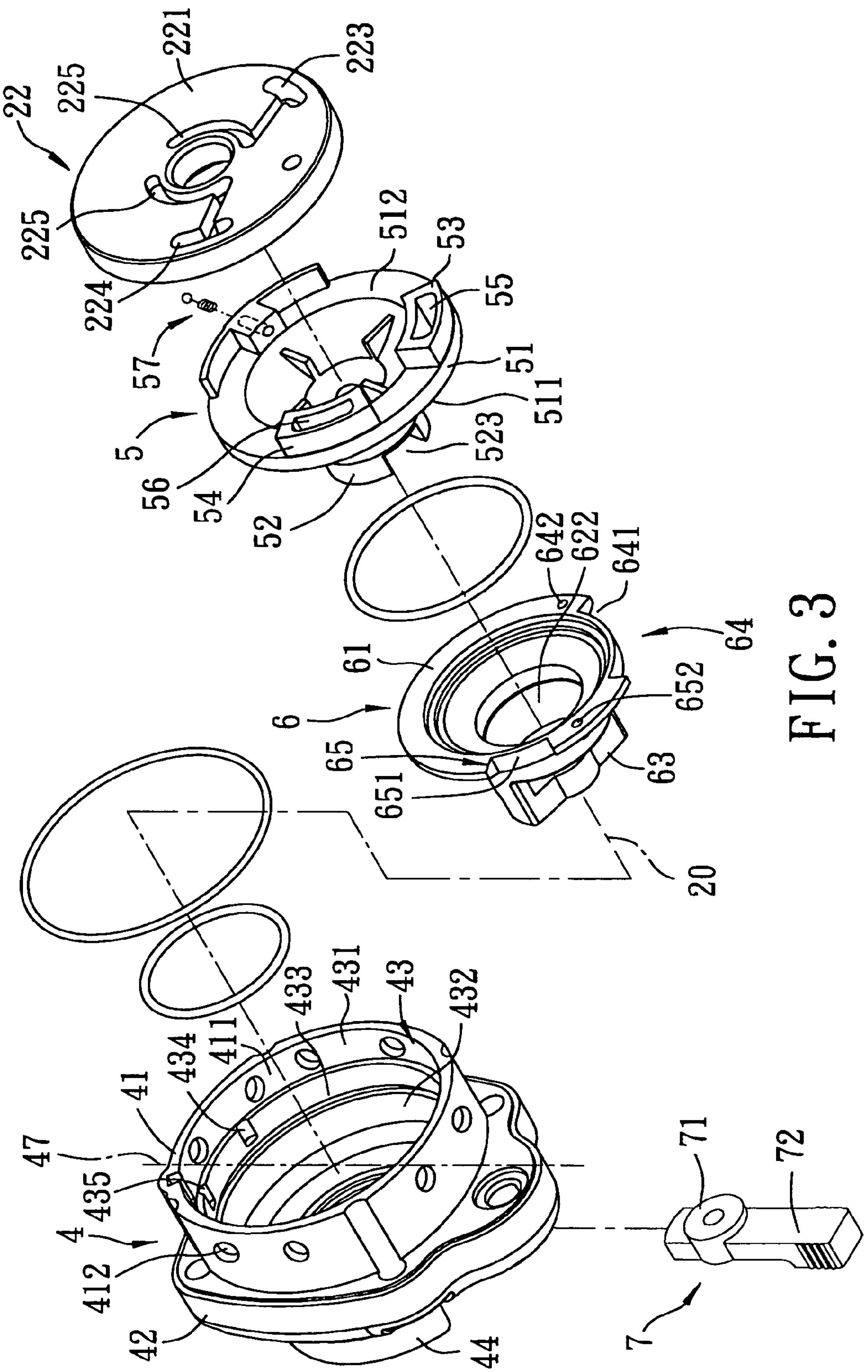
FIG. 3 is a fragmentary front exploded perspective view of the first preferred embodiment.

Referring to FIGS. 1, 2 and 3, the first preferred embodiment of a pneumatic tool according to the present invention is shown to include a housing 1, a driving mechanism 2, an air intake device 3, a rear cap 4, a direction controller 5, a speed controller 6, and an operating member 7.

The housing 1 includes two housing parts that are coupled to each other to form an upper assembly portion 11 and a lower handle portion 12 connected to the upper assembly portion 11. The upper assembly portion 11 is formed with an elongate component chamber 111 that extends horizontally. The lower handle portion 12 is formed with an air intake passageway 121 and an air exhaust duct 122 disposed in front of the intake passageway 121 and in fluid communication with the component chamber 111. In other embodiments, the housing 1 may be designed as an integrally formed single piece.

The driving mechanism 2 is mounted in the component chamber 111, and includes a front bearing member 21, and a rear bearing member 22 disposed proximate to the rear end of the component chamber 111 and spaced apart from the front bearing member 21. An air cylinder device 23 is disposed between the front and rear bearing members 21, 22, and is formed with a cylinder chamber 231 and a plurality of vent holes 230. The air cylinder device 23 includes a rotor 24 that is disposed in the cylinder chamber 231 and that has two ends coupled rotatably and respectively to the front and rear bearing members 21, 22. The air cylinder device 23 further includes an impact unit 25 co-rotatable with the rotor 24. An output shaft 26 is coupled to the impact unit 25 of the air cylinder device 23, and is driven by the impact unit 25 for rotation about a rotary axis 20.

The rear bearing member 22 has a front side 221 that faces toward the cylinder chamber 231, and a rear side 222 opposite to the front side 221. The rear bearing member 22 is formed with a first forward hole 223 and a first reverse hole 224 that extend through the front and rear sides 221, 222, that are disposed proximate to an outer peripheral edge of the rear bearing member 22, that are angularly spaced apart from each other, and that are in spatial communication with the cylinder chamber 231. The front side 221 is formed with a pair of guide grooves 225, each of which extends from a respective one of the first forward hole 223 and the first reverse hole 224 toward the rotary axis 20. In view of the guide grooves 225, air flowing through one of the first forward hole 223 and the first reverse hole 224 can be guided toward the center of the rotor 24 so as to blow on vanes 241 of the rotor 24 in radial outward directions.

Since the specific construction and operation of the driving mechanism 2 are known in the art and are not pertinent to the claimed invention, further details thereof are omitted herein for the sake of brevity.

The air intake device 3 is mounted in the intake passageway 121 to control air flow therethrough, and includes a control shaft 31 for driving a valve member 32 to unblock a hole 331 in a valve seat 33. Since the air intake device 3 is also known in the art, it will not be described further for the sake of brevity.

The rear cap 4 has a peripheral wall 41, a fastener wall 42, and a notched stop ring 44. The peripheral wall 41, which surrounds the rotary axis 20, is coupled to the housing 1 at a rear end of the component chamber 111, and is formed with a set of radial vent holes 412. The peripheral wall 41 has an inner surface 411 defining a cap chamber 43 that is in spatial communication with the component chamber 111. The inner surface 411 of the peripheral wall 41 is stepped to configure the cap chamber 43 into a first section 431, a second section 432, and a third section 433 between the first and second sections 431, 432 and larger than the second section 432. The inner surface 411 is formed with first and second positioning cavities 434, 435 at the third section 433 of the cap chamber 43. The positioning cavities 434, 435 are disposed on opposite sides of a center line 47 that is transverse to and that intersects the rotary axis 20, and are spaced apart at equal distances from the centerline 47. The rear bearing member 22 is disposed in the first section 431 of the cap chamber 43.

The fastener wall 42 extends in radial outward directions from a rear side of the peripheral wall 41, and is formed with fastener holes to permit extension of fasteners 40 therethrough, thereby securing the rear cap 4 on the upper assembly portion of the housing 1.

The notched stop ring 44 extends rearwardly away from the peripheral wall 41, and has an inner ring surface 441 that surrounds the rotary axis 20, and an inclined ring surface 442 that extends from the inner ring surface 441 and that inclines radially and outwardly relative to the rotary axis 20. The notched stop ring 44 further has forward and reverse stop ends 443, 444 disposed on opposite sides of the center line 47. The inner ring surface 441 is formed with a blind hole 445 to receive a spring-biased ball 45. The inclined ring surface 442 is provided with a set of angularly spaced apart speed indicating indicia 446. In this embodiment, there are three speed indicating indicia, the diameters of which differ to indicate three different speeds.

The rear cap 4 is further formed with a connecting passageway 46 that has a first opening 461 in fluid communication with the intake passageway 121, and a second opening 462 in fluid communication with the cap chamber 43.

In other embodiments, the rear bearing member 22 may be formed integrally with the air cylinder device 23.

The direction controller 5 is mounted in the cap chamber 43, and is rotatable about the rotary axis 20. The direction controller 5 includes a base wall 51 that is transverse to the rotary axis 20 and that has front and rear sides 512, 511, a coupling stub 52 that projects from the rear side 511 of the base wall 51, and first and second abutment posts 53, 54 that project from the front side 512 of the base wall 51 and that are disposed to abut against the rear side 222 of the rear bearing member 22. A second forward hole 55 is formed through the base wall 51 and the first abutment post 53. A second reverse hole 56 is formed through the base wall 51 and the second abutment post 54. The coupling stud 52 has an end face formed with a fastener hole 522 along the rotary axis 20, and an engaging groove 523. The first and second abutment posts 53, 54 cooperate to form an angle smaller than that formed between the first forward and reverse holes 223, 224. As such, when the second forward hole 55 is registered with the first forward hole 223, the first and second reverse holes 224, 56 are misaligned, and when the second reverse hole 56 is registered with the first reverse hole 224, the first and second forward holes 223, 55 are misaligned.

In order to position the direction controller 5 during forward or reverse operation of the pneumatic tool, a spring-biased ball 57 is provided at an outer periphery 513 of the base wall 51 for engaging one of the first and second positioning cavities 434, 435.

The speed controller 6 is mounted in the cap chamber 43 behind the direction controller 5, and is rotatable about the rotary axis 20. The speed controller 6 includes a ring wall 61 that abuts against the base wall 51 and that is formed with a forward speed regulator 64 and a reverse speed regulator 65, and an operating part that extends from the ring wall 61 in a direction away from the component chamber 111 and that is accessible externally of the rear cap 4 and the housing 1. The operating part includes a tubular stub 62 that projects rearwardly from the ring wall 61 and that surrounds the rotary axis 20, and a handle 63 that is disposed at one end of the tubular stub 62 remote from the ring wall 61 and that extends along a diametric line with respect to the rotary axis 20. The tubular stub 62 is formed with a tube hole 622 for receiving the coupling stub 52 of the direction controller 5, and has upper and lower wall sections 623, 624 disposed on opposite sides of the handle 63. The lower wall section 624 has a length along the rotary axis 20 that is shorter than a length of the upper wall section 623 along the rotary axis 20. The upper wall section 623 of the tubular stub 62 has an outer surface formed with a set of angularly spaced apart positioning cavities 625 to engage selectively the spring-biased ball 45 of the rear cap 4. In this embodiment, there are three positioning cavities 625 that correspond respectively to the speed indicating indicia 446 of the rear cap 4. The handle 63 is formed with an opening 631 that is registered with the fastener hole 522 in the coupling stub 52 of the direction controller 5, and is provided with a pointer 632 for pointing to a radially aligned one of the speed indicating indicia 446. Each of the forward and reverse speed regulators 64, 65 includes a regulating notch 641, 651 formed in the ring wall 61 and indented from an outer ring periphery of the ring wall 61, and a regulating hole 642, 652 formed in the ring wall 61 and disposed proximate to the regulating notch 641, 651.

The operating member 7 has a coupling portion 71 fastened to the coupling stub 52 of the direction controller 5, and an operating portion 72 extending from the coupling portion 71 and disposed radially relative to the rotary axis 20. In this embodiment, the coupling portion 71 has a spline engagement with the coupling stub 52 at the engaging groove 523, and a screw fastener 70 extends through the coupling portion 71 and engages the fastener hole 522 in the coupling stub 52, thereby fastening the coupling portion 71 to the coupling stub 52. The coupling portion 71 is disposed in the tube hole 622 rearwardly of the lower wall section 624 of the tubular stub 62 of the speed controller 6. The operating portion 72 extends through the stop ring 44 of the rear cap 4, and cooperates with the forward and reverse stop ends 443, 444 of the stop ring 44 to limit extent of rotation of the direction controller 5.

Referring to FIGS. 1, 2, 4 and 5, when the pneumatic tool is operated such that forward shaft speed is at a maximum, the operating portion 72 of the operating member 7 is moved to the left, i.e., the left side of the center line 47, thereby rotating the direction controller 5 about the rotary axis 20 such that the first and second forward holes 223, 55 are aligned, and such that the spring-biased ball 57 engages the positioning cavity 435. Moreover, the handle 63 of the speed controller 6 is operated to align the pointer 632 with a largest one of the speed-indicating indicia 446. The entire regulating notch 641 of the forward speed regulator 64 overlaps the second forward hole 55, and the spring-biased ball 45 engages a corresponding one of the positioning cavities 625 at this time. As a result, air for driving forward rotation of the output shaft 26 is able to flow into the cylinder chamber 231 via a first flow path that includes the intake passageway 121, the connecting passageway 46, the regulating notch 641 of the forward speed regulator 64, and the first and second forward holes 223, 55. When the rotor 24 rotates, the output shaft 26 is driven to rotate at the forward maximum speed via the impact unit 25. At this moment, most of the air that flowed into the cylinder chamber 231 flows to the component chamber 111 through the vent holes 230 of the air cylinder device 23, and is subsequently discharged via the air exhaust duct 122 of the housing 1. However, a small portion of the air flows into the area between the rear side 222 of the rear bearing member 22 and the front side 512 of the base wall 51 of the direction controller 5 via the first reverse hole 224. Since the part of the rear cap 4 that corresponds to the aforesaid area is formed with the radial vent holes 412, the small portion of the air is likewise discharged via the air exhaust duct 122 of the housing 1.

Figure 6:
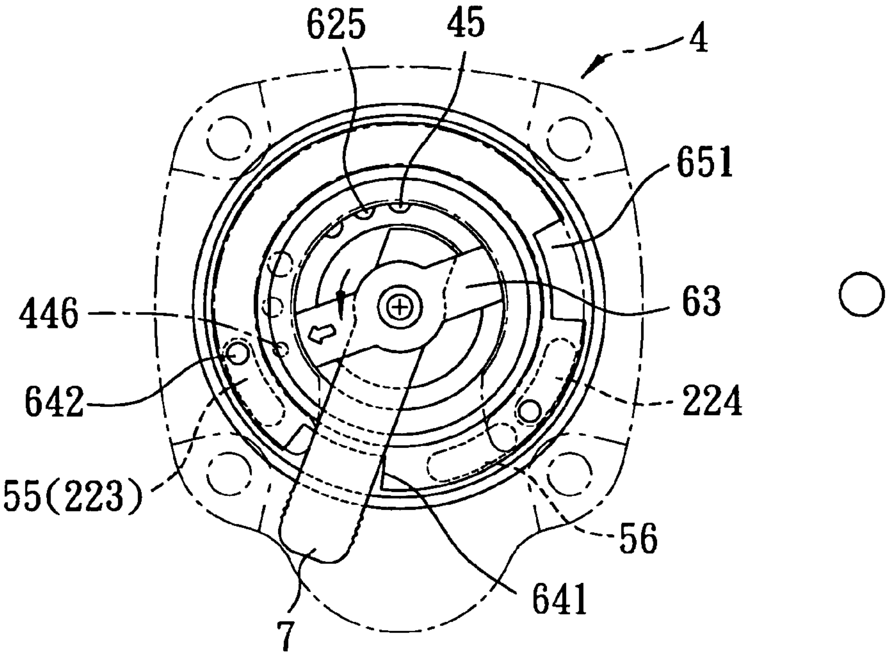
FIG. 6 is a view similar to FIG. 4, but illustrating a state where the forward shaft speed is at a minimum.
Figure 7:
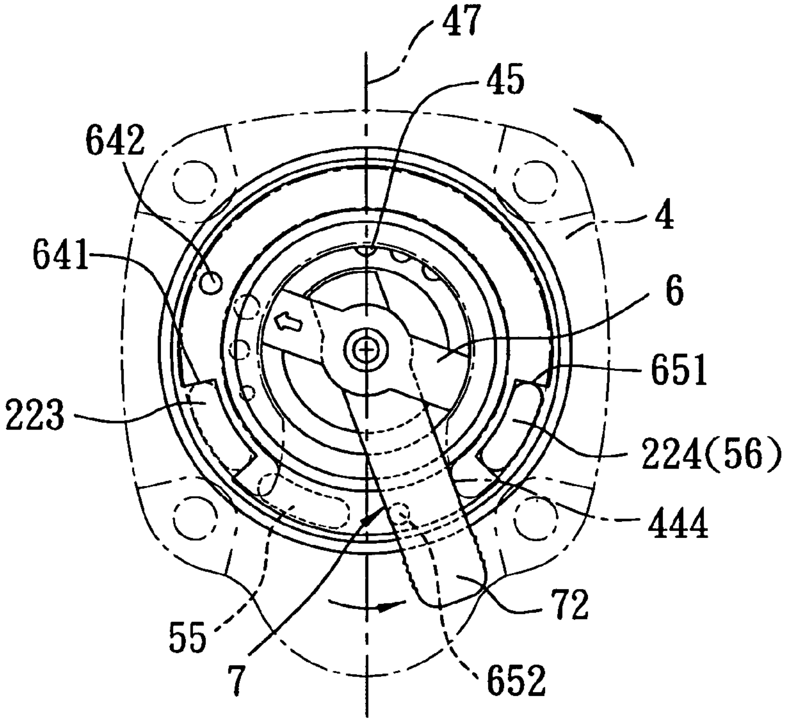
FIG. 7 is a view similar to FIG. 4, but illustrating a state where reverse shaft speed is at a maximum.
Figure 8:
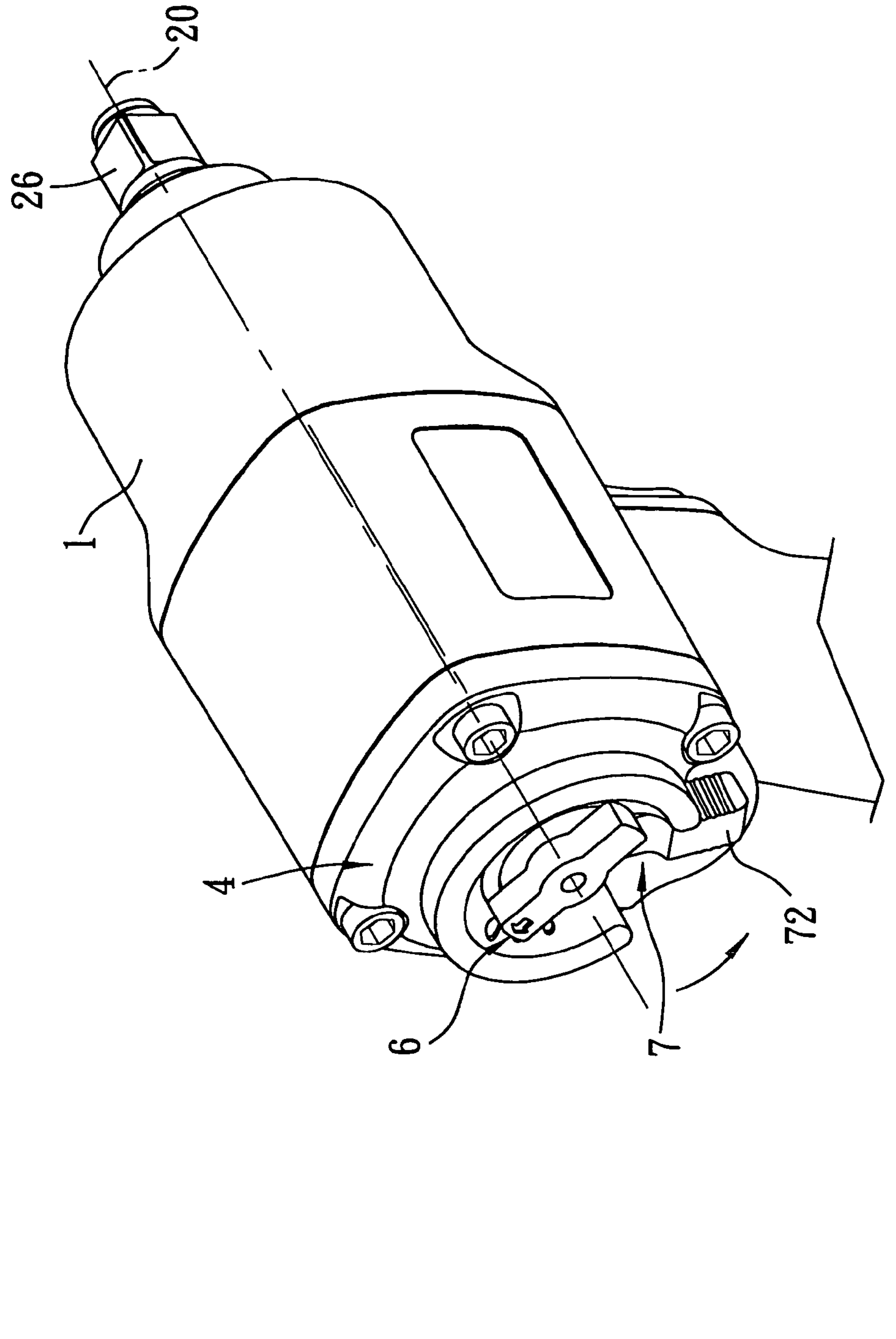
FIG. 8 is a fragmentary rear perspective view of the first preferred embodiment.

Referring to FIGS. 1, 2 and 6, when it is subsequently intended to operate the pneumatic tool such that the forward shaft speed is reduced to decrease the output torque of the output shaft 26, it is simply required to operate the handle 63 of the speed controller 6 so as to align the pointer 632 with another one of the speed-indicating indicia 446. Either only half (not shown) of the regulating notch 641 or the regulating hole 642 of the forward speed regulator 64 overlaps the second forward hole 55 to reduce air flow into the cylinder chamber 231 and thus the speed of the output shaft 26. The spring-biased ball 45 engages another corresponding one of the positioning cavities 625 at this time.

Therefore, by operating the handle 63 of the speed controller 6, the extent of overlap between the forward speed regulator 64 and the second forward hole 55 is varied to regulate air flow through the first flow path, thereby varying the torque and speed of the output shaft 26 accordingly.

Figure 4:
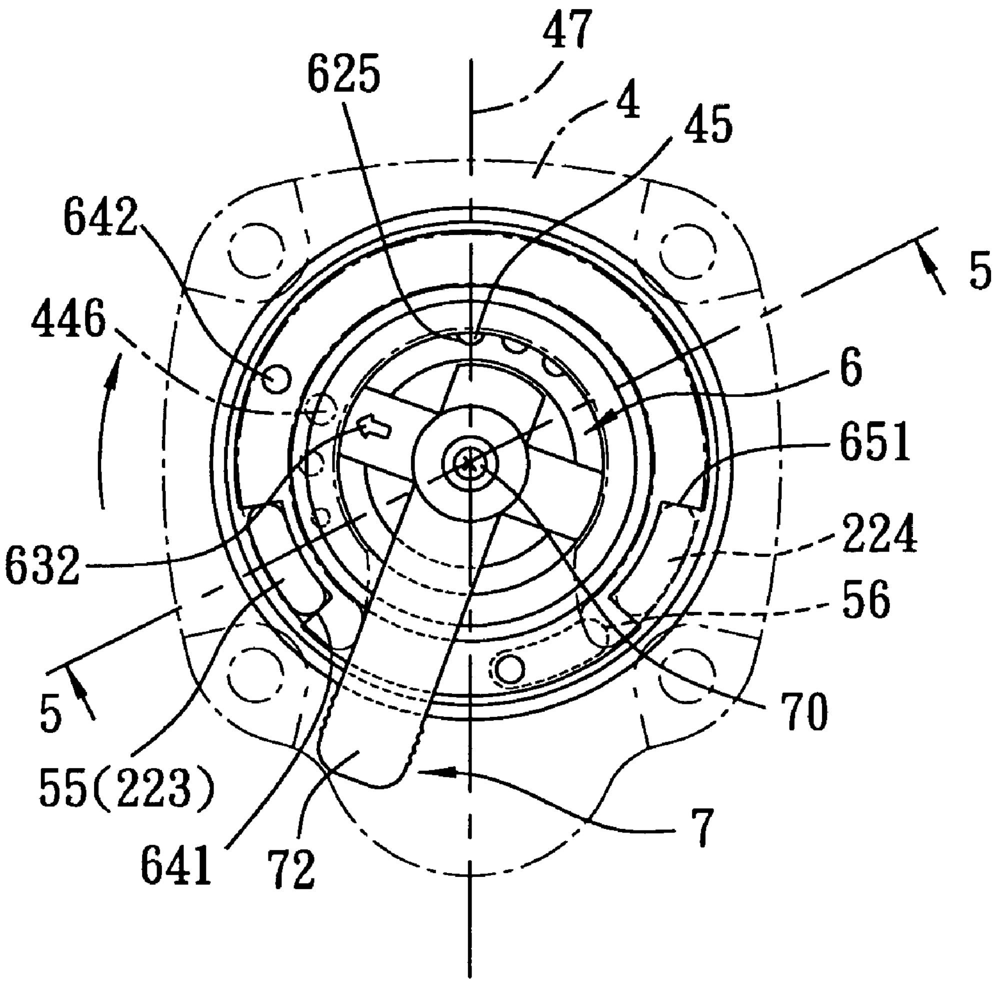
FIG. 4 is a fragmentary schematic rear end view of the first preferred embodiment, illustrating a state where forward shaft speed is at a maximum.
Figure 5:
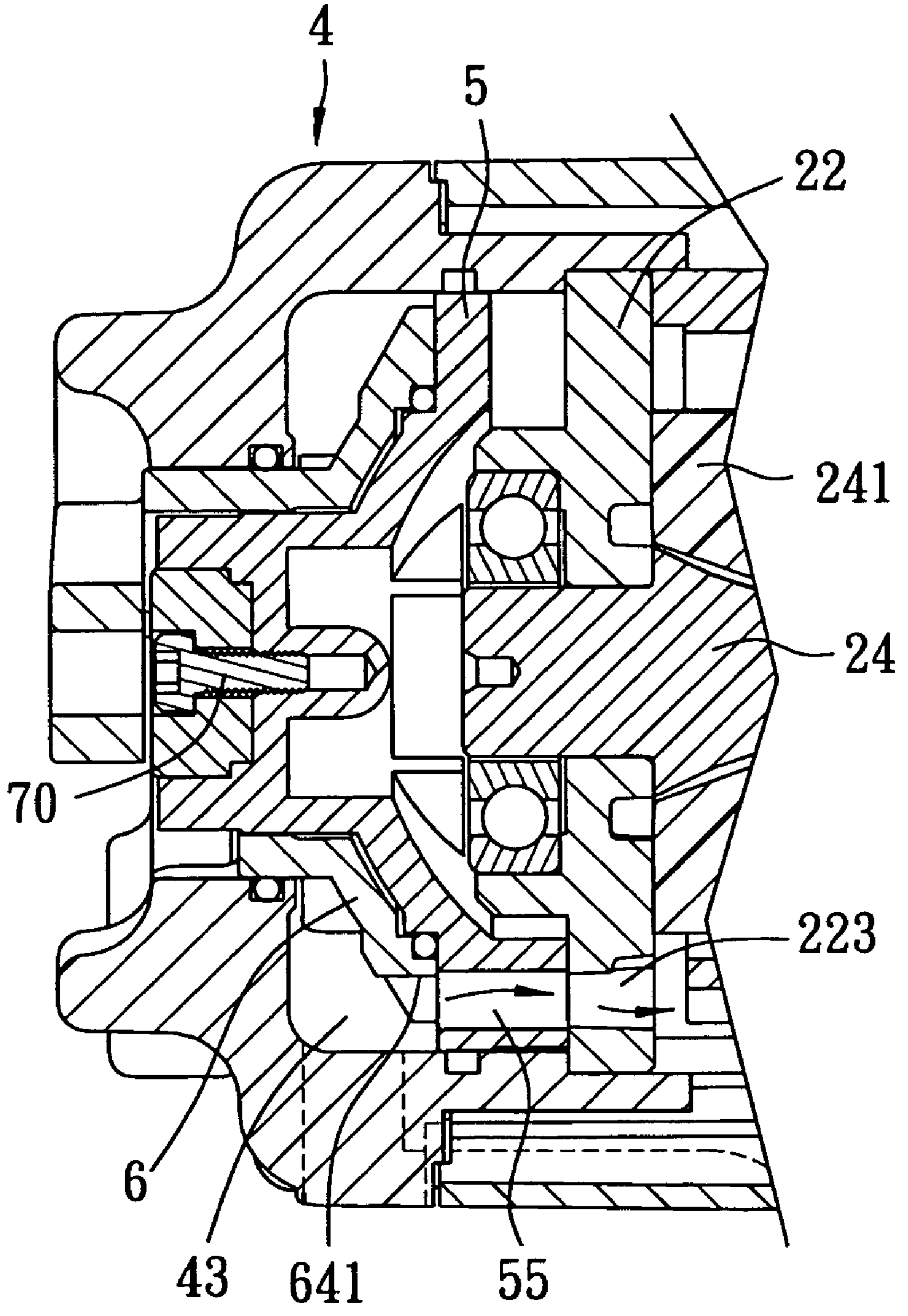
FIG. 5 is a fragmentary schematic sectional view of the first preferred embodiment, taken along line 5—5 of FIG. 4.

Referring to FIGS. 1, 3, 7 and 8, when it is desired to change the operating state of the pneumatic tool from that shown in FIGS. 4 and 5 to that where reverse shaft speed is at a maximum, the operating portion 72 of the operating member 7 is moved to the right, i.e., the right side of the center line 47, thereby rotating the direction controller 5 about the rotary axis 20 such that the first and second reverse holes 224, 56 are aligned, and such that the spring-biased ball 57 engages the positioning cavity 434. The speed controller 6 does not move with the direction controller 5. That is, while the pointer 632 is still aligned with a largest one of the speed-indicating indicia 446, the entire regulating notch 651 of the reverse speed regulator 65 now overlaps the second reverse hole 56. As a result, air for driving reverse rotation of the output shaft 26 is able to flow into the cylinder chamber 231 via a second flow path that includes the intake passageway 121, the connecting passageway 46, the regulating notch 651 of the reverse speed regulator 65, and the first and second reverse holes 224, 56. Because air enters into the cylinder chamber 231 in a direction different from that in the operating state of FIGS. 4 and 5, the rotor 24 and the impact unit 25 cooperate to drive rotation of the output shaft 26 in the reverse direction.

Similar to the operation described hereinabove, when the handle 63 of the speed controller 6 is subsequently operated, the extent of overlap between the reverse speed regulator 65 and the second reverse hole 56 is varied to regulate air flow through the second flow path, thereby varying torque and speed of the output shaft 26 accordingly.

It is worth noting that, when the pneumatic tool is in use, the requirement of direction change is more frequent than that of speed (or torque) change. To this end, the pneumatic tool of this invention is convenient to use since direction change is conducted by simply moving the operating portion 72 of the operating member 7 with the use of the thumb of the user.

Figure 9:
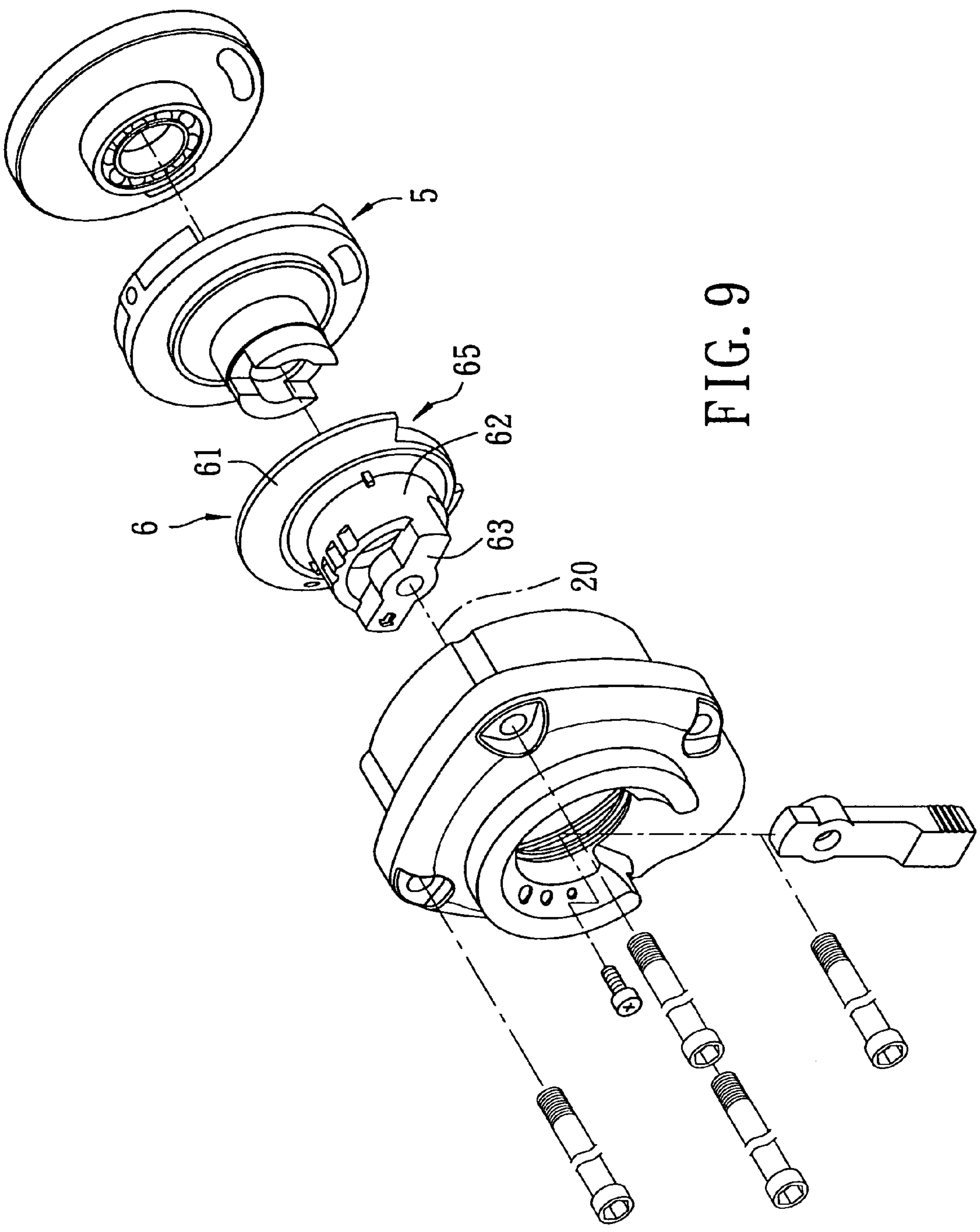
FIG. 9 is a fragmentary rear exploded perspective view of the second preferred embodiment of a pneumatic tool according to the present invention.
Figure 10:
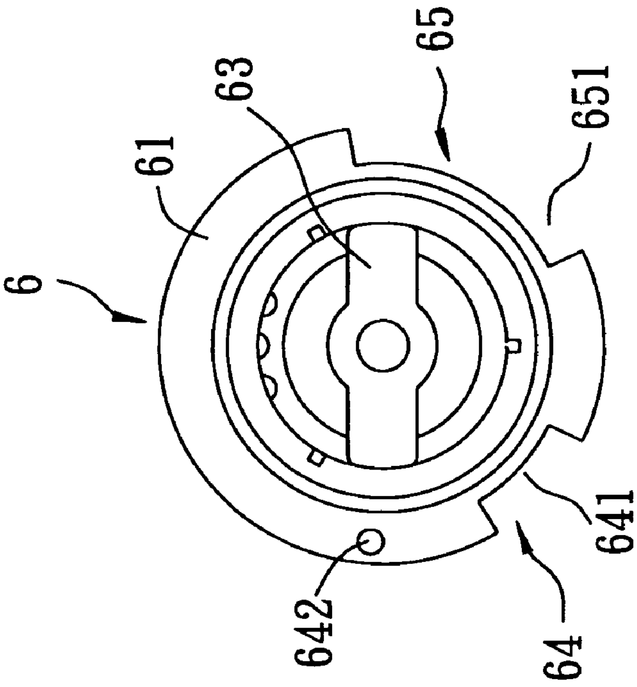
FIG. 10 is a rear schematic view of a speed controller of the second preferred embodiment.

Referring to FIGS. 9 and 10, the second preferred embodiment of a pneumatic tool according to this invention is shown to have a construction similar to the previous embodiment. The forward speed regulator 64 of the speed controller 6 likewise includes a forward regulating notch 641 formed in the ring wall 61, and a regulating hole 642 formed in the ring wall 61 and disposed proximate to the forward regulating notch 641. However, unlike the previous embodiment, the reverse speed regulator 65 only includes a reverse regulating notch 651 formed in the ring wall 61. The reverse regulating notch 651 has a circumferential width relative to the rotary axis 20 that is larger than (preferably twice) that of the forward regulating notch 641.

Figure 11:
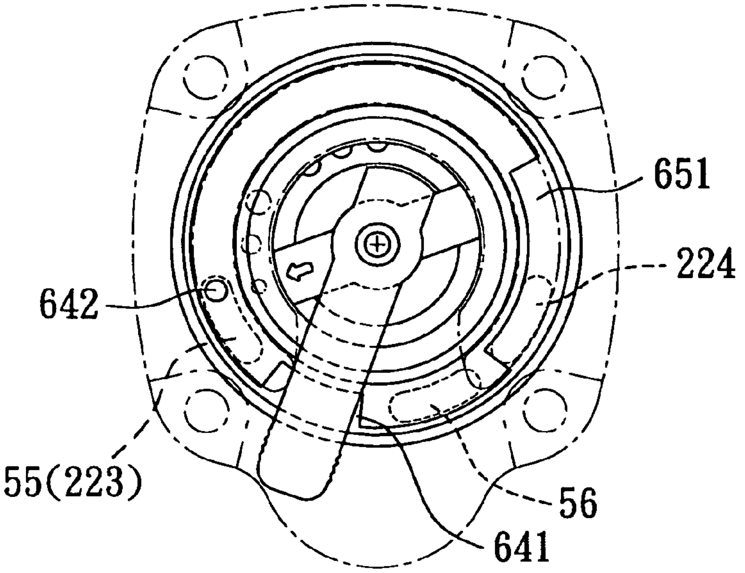
FIG. 11 is a fragmentary schematic rear end view of the second preferred embodiment, illustrating a state where forward shaft speed is at a minimum.
Figure 12:
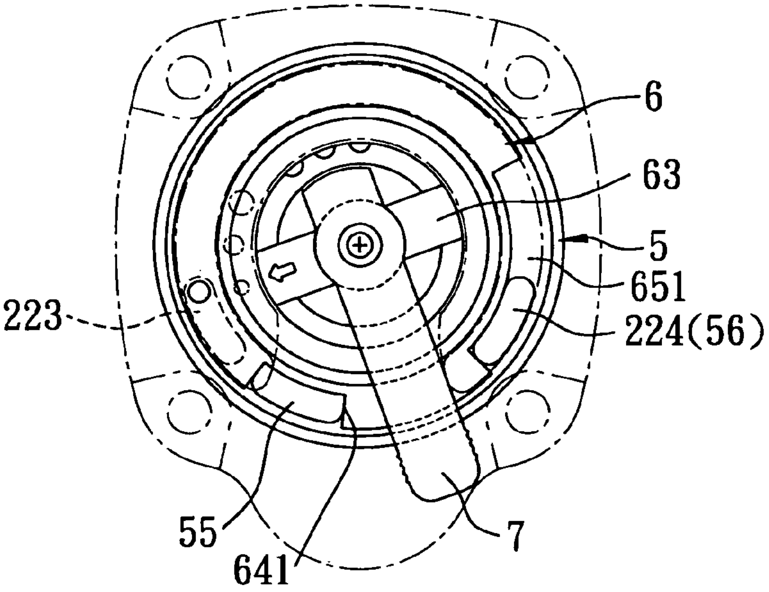
FIG. 12 is a view similar to FIG. 11, but illustrating a state upon switching the shaft direction to reverse.

Referring to FIG. 11, when the pneumatic tool is operated such that forward shaft speed is at a minimum, the regulating hole 642 of the forward speed regulator 64 overlaps the first and second forward holes 223, 55. Thereafter, referring to FIG. 12, when the operating member 7 is moved to switch the shaft direction to reverse, in view of its large circumferential width, the reverse regulating notch 651 is able to overlap entirely the first and second reverse holes 224, 56. As a result, regardless of the initial speed in the forward direction, switching the shaft direction to reverse results in maximum reverse shaft speed, which facilitates screw loosening operations when the pneumatic tool of this embodiment is in use.

It has thus been shown that the pneumatic tool of this invention includes direction and speed controllers 5, 6 that are operable independently and easily to adjust the shaft direction and speed.

While the present invention has been described in connection with what is considered the most practical and preferred embodiments, it is understood that this invention is not limited to the disclosed embodiments but is intended to cover various arrangements included within the spirit and scope of the broadest interpretation so as to encompass all such modifications and equivalent arrangements.

I claim:

1. A pneumatic tool comprising:

a housing formed with a component chamber and an intake passageway, said component chamber having a rear end;

a driving mechanism mounted in said component chamber and including a rear bearing member disposed proximate to said rear end of said component chamber and having a rear side, an air cylinder device disposed in front of said rear bearing member and formed with a cylinder chamber, and an output shaft coupled to said air cylinder device for rotation about a rotary axis, said rear bearing member being formed with a first forward hole and a first reverse hole that are in spatial communication with said cylinder chamber;

a rear cap having a peripheral wall coupled to said housing at said rear end of said component chamber, said peripheral wall defining a cap chamber that is in spatial communication with said component chamber, said rear cap being formed with a connecting passageway that intercommunicates said cap chamber and said intake passageway;

a direction controller mounted in said cap chamber and rotatable about said rotary axis, said direction controller including a base wall transverse to said rotary axis, and first and second abutment posts that project from said base wall and that are disposed to abut against said rear side of said rear bearing member, said direction controller having a second forward hole formed through said base wall and said first abutment post, and a second reverse hole formed through said base wall and said second abutment post;

a speed controller mounted in said cap chamber and rotatable about said rotary axis, said speed controller including a ring wall formed with a forward speed regulator and a reverse speed regulator, and an operating part that extends from said ring wall in a direction away from said component chamber and that is accessible externally of said rear cap and said housing; and an operating member coupled to said direction controller and accessible externally of said rear cap and said housing;

said operating member being operable to drive rotation of said direction controller about said rotary axis for aligning said first and second forward holes such that air for driving forward rotation of said output shaft is able to flow into said cylinder chamber via a first flow path that includes said intake passageway, said connecting passageway, said forward speed regulator, and said first and second forward holes;

said operating member being further operable to drive rotation of said direction controller about said rotary axis for aligning said first and second reverse holes such that air for driving reverse rotation of said output shaft is able to flow into said cylinder chamber via a second flow path that includes said intake passageway, said connecting passageway, said reverse speed regulator, and said first and second reverse holes;

said operating part of said speed controller being operable to vary extent of overlap between one of said forward and reverse speed regulators and a corresponding one of said second forward and reverse holes for regulating amount of air flow through one of said first and second flow paths, thereby varying torque and speed of said output shaft accordingly.

2. The pneumatic tool as claimed in claim 1, wherein said operating part of said speed controller includes a stub that projects rearwardly from said ring wall, and a handle that is disposed at one end of said stub remote from said ring wall and that extends along a diametric line with respect to said rotary axis.

3. The pneumatic tool as claimed in claim 2, wherein said direction controller further includes a coupling stub that projects from said base wall away from said rear side of said rear bearing member, said operating member having a coupling portion fastened to said coupling stub, and an operating portion extending from said coupling portion and disposed radially relative to said rotary axis.

4. The pneumatic tool as claimed in claim 3, wherein said coupling portion has a spline engagement with said coupling stub.

5. The pneumatic tool as claimed in claim 3, wherein said direction controller further includes a screw fastener for fastening said coupling portion to said coupling stub.

6. The pneumatic tool as claimed in claim 3, wherein said stub is tubular and includes upper and lower wall sections disposed on opposite sides of said handle, said lower wall section having a length along said rotary axis that is shorter than a length of said upper wall section along said rotary axis, said coupling portion of said operating member being disposed rearwardly of said lower wall section of said stub.

7. The pneumatic tool as claimed in claim 6, wherein said upper wall section of said stub has an outer surface formed with a set of angularly spaced apart positioning cavities, said rear cap further including a spring-biased ball for engaging one of said positioning cavities.

8. The pneumatic tool as claimed in claim 7, wherein said rear cap further includes a stop ring that extends rearwardly away from said peripheral wall, said stop ring having an inclined ring surface that inclines radially and outwardly relative to said rotary axis, said inclined ring surface being provided with a set of speed indicating indicia that correspond to said positioning cavities, said handle being provided with a pointer for pointing to a radially aligned one of said speed indicating indicia.

9. The pneumatic tool as claimed in claim 7, wherein said rear cap further includes a notched stop ring that extends rearwardly away from said peripheral wall and that has forward and reverse stop ends disposed on opposite sides of a center line that is transverse to and that intersects said rotary axis, said operating portion extending through said stop ring and cooperating with said forward and reverse stop ends to limit extent of rotation of said direction controller.

10. The pneumatic tool as claimed in claim 1, wherein said peripheral wall of said rear cap is formed with first and second positioning cavities, said base wall of said direction controller having an outer periphery, said direction controller further including a spring-biased ball provided at said outer periphery of said base wall for engaging one of said first and second positioning cavities.

11. The pneumatic tool as claimed in claim 1, wherein said peripheral wall of said rear cap is formed with a set of radial vent holes.

12. The pneumatic tool as claimed in claim 1, wherein each of said forward and reverse speed regulators includes a regulating notch formed in said ring wall, and a regulating hole formed in said ring wall and disposed proximate to said regulating notch.

13. The pneumatic tool as claimed in claim 1, wherein said forward speed regulator includes a forward regulating notch formed in said ring wall, and a regulating hole formed in said ring wall and disposed proximate to said forward regulating notch, said reverse speed regulator including a reverse regulating notch formed in said ring wall, said reverse regulating notch having a circumferential width relative to said rotary axis larger than that of said forward regulating notch.

* * * * *